US008896500B2

(12) United States Patent
Kobayashi

(10) Patent No.: US 8,896,500 B2
(45) Date of Patent: Nov. 25, 2014

(54) HEAD-MOUNTED DISPLAY DEVICE AND CONTROL METHOD FOR THE HEAD-MOUNTED DISPLAY DEVICE

(75) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 13/353,731

(22) Filed: Jan. 19, 2012

(65) Prior Publication Data

US 2012/0200478 A1    Aug. 9, 2012

(30) Foreign Application Priority Data

Feb. 4, 2011    (JP) ................................. 2011-022206

(51) Int. Cl.
G09G 5/00    (2006.01)
G02B 27/01    (2006.01)
G09G 3/00    (2006.01)
G09G 3/34    (2006.01)

(52) U.S. Cl.
CPC .............. *G02B 27/017* (2013.01); *G09G 3/003* (2013.01); *G02B 2027/0178* (2013.01); *G09G 2310/0237* (2013.01); *G09G 3/3406* (2013.01); *G02B 2027/014* (2013.01)
USPC ................................ 345/8; 345/156; 345/634

(58) Field of Classification Search
CPC ........... G02B 27/017; G02B 2027/014; G02B 27/0172; G02B 27/01; G02B 6/00; G02B 27/02; G06F 3/012; G06F 3/0482; H04N 13/044; H04N 13/0459; H04N 5/7491
USPC ........ 345/8, 77, 102, 156, 633, 634; 359/630; 356/614
See application file for complete search history.

(56) References Cited

U.S. PATENT DOCUMENTS

| | | | |
|---|---|---|---|
| 6,050,717 A | | 4/2000 | Kosugi et al. |
| 7,199,934 B2* | | 4/2007 | Yamasaki ..................... 359/630 |
| 2003/0067613 A1* | | 4/2003 | Ishikawa et al. .............. 356/614 |
| 2004/0227708 A1* | | 11/2004 | Huelson et al. ................. 345/77 |
| 2006/0017657 A1 | | 1/2006 | Yamasaki |
| 2006/0028400 A1* | | 2/2006 | Lapstun et al. .................... 345/8 |
| 2008/0129679 A1* | | 6/2008 | Yamamoto .................... 345/102 |
| 2009/0243967 A1* | | 10/2009 | Kato ................................. 345/8 |
| 2011/0018903 A1* | | 1/2011 | Lapstun et al. ............... 345/633 |
| 2012/0206443 A1 | | 8/2012 | Kimura et al. |
| 2012/0242560 A1 | | 9/2012 | Nakada et al. |
| 2012/0242570 A1 | | 9/2012 | Kobayashi |
| 2012/0242677 A1 | | 9/2012 | Kobayashi |

FOREIGN PATENT DOCUMENTS

JP    A-9-304727    11/1997

* cited by examiner

Primary Examiner — Thuy Pardo
(74) Attorney, Agent, or Firm — Oliff PLC

(57) ABSTRACT

A head-mounted display device that is mounted on the head of an observer and forms a virtual image before the eyes of the observer includes: a display device that forms an image, which is the source of image light, from image data; a light source that emits the image light representing the formed image; a light guide unit that forms a virtual image from the emitted image light; and a display control unit that turns off the light source and changes the head-mounted display device to a suspension mode when a suspension request is received from the outside.

13 Claims, 5 Drawing Sheets

HEAD-MOUNTED DISPLAY DEVICE AND CONTROL METHOD FOR THE HEAD-MOUNTED DISPLAY DEVICE

BACKGROUND

1. Technical Field

The present invention relates to a head-mounted display device that is used while being mounted on the head of an observer to thereby form a virtual image in a visual field area of the observer.

2. Related Art

In recent years, there is known a head-mounted display device that is used while being mounted on the head of an observer to thereby form a virtual image in a visual field area of the observer. The head-mounted display device is called head mounted display (HMD) as well. As the HMD, there are known a transmissive HMD that enables the observer to see an external scenery while wearing the HMD device and a non-transmissive HMD that blocks the external scenery when the observer wears the HMD device. The transmissive HMD forms a virtual image in the visual field area of the observer together with the external scenery by causing an optical system or the like arranged before the eyes of the observer to reflect image light generated by a light modulation device such as a liquid crystal panel.

The observer can enjoy an image (a video) and sound anywhere while wearing the HMD device like eyeglasses. On the other hand, there is also a demand for suspension of a state in which the image (the video) and the sound are reproduced in the HMD device. Concerning such a demand, in the past, there is known a technique for enabling the observer to check the state of the outside world by suspending the image (the video) and/or the sound when the observer performs mute operation and changing a screen to a see-through state (e.g., JP-A-09-304727).

In this technique, since the display of the image (the video) is suspended when the mute operation is performed and the screen is changed to the see-through state, some time lag occurs from the mute operation until the screen changes to the see-through state.

SUMMARY

An advantage of some aspects of the invention is to provide a technique for enabling an observer to quickly check the state of the outside world when mute operation is performed in a head-mounted display device.

APPLICATION EXAMPLE 1

This application example of the invention is directed to a head-mounted display device that is mounted on the head of an observer and forms a virtual image before the eyes of the observer, the head-mounted display device including: a display device that forms an image, which is the source of image light, from image data; a light source that emits the image light representing the formed image; a light guide unit that forms a virtual image from the emitted image light; and a display control unit that turns off the light source and changes the head-mounted display device to a suspension mode when a suspension request is received from the outside.

With such a configuration, the display control unit turns off the light source and changes the head-mounted display device to the suspension mode when the suspension request is received from the outside. Therefore, in the head-mounted display device, it is possible to enable the observer to quickly check the state of the outside world when the suspension request (mute operation) is performed.

APPLICATION EXAMPLE 2

This application example of the invention is directed to the head-mounted display device of Application Example 1, which further includes: a sound output unit that outputs sound; and a sound processing unit that acquires a sound signal, outputs the sound signal to the sound output unit, and, when the suspension request is received, stops the output of the sound signal and changes the head-mounted display device to the suspension mode.

With such a configuration, the sound processing unit stops the output of the sound signal and changes the head-mounted display device to the suspension mode when the suspension request from the outside is received. Therefore, in the head-mounted display device, it is possible to enable the observer to quickly check the state of the outside world when the suspension request (the mute operation) is performed.

APPLICATION EXAMPLE 3

This application example of the invention is directed to the head-mounted display device of Application Example 2, which further includes a pair of the display devices, a pair of the light sources, and a pair of the light guide units corresponding to the left and right eyes of the observer and a pair of the sound output units corresponding to the left and right ears of the observer. The display control unit turns off both the pair of the light sources when the suspension request is received. The sound processing unit stops the output of the sound signal to both the pair of the sound output units when the suspension request is received.

With such a configuration, the display control unit turns off both the pair of light sources when the suspension request is received and the sound processing unit stops the output of the sound signal to both the pair of sound output units when the suspension request is received. Therefore, in the head-mounted display device of a binocular type, it is possible to enable the observer to quickly and surely check the state of the outside world when the suspension request (the mute operation) is performed.

APPLICATION EXAMPLE 4

This application example of the invention is directed to the head-mounted display device of Application Example 2, which further includes a pair of the display devices, a pair of the light sources, and a pair of the light guide units corresponding to the left and right eyes of the observer and a pair of the sound output units corresponding to the left and right ears of the observer. The display control unit turns off one of the pair of the light sources when the suspension request is received. The sound processing unit outputs the sound signal adjusted to reduce the volume of the sound output from the sound output unit to be equal to or smaller than a predetermined dB value to both the pair of the sound output units when the suspension request is received.

With such a configuration, the display control unit turns off one of the pair of light sources when the suspension request is received and the sound processing unit outputs the sound signal adjusted to reduce the volume of the sound output from the sound output unit to be equal to or smaller than the predetermined dB value to both the pair of sound output units when the suspension request is received. Therefore, in the head-mounted display device of the binocular type, it is possible to enable the observer to quickly check the state of the outside world while enjoying an image (a video) and sound when the suspension request (the mute operation) is performed.

APPLICATION EXAMPLE 5

This application example of the invention is directed to the head-mount display device of any of Application Examples 1 to 4, wherein, when the head-mounted display device is in the suspension mode, the display control unit stops the formation of an image by the display device after the elapse of a first time set in advance, transitions an operation state of the head-mounted display device to a standby state, in which power consumption is low compared with an active state in which the formation of a virtual image is possible, after the elapse of a second time set in advance, and stops the supply of electric power to the head-mounted display device after the elapse of a third time set in advance.

With such a configuration, when the head-mounted display device is in the suspension mode, the display control unit stops the formation of an image by the display device after the elapse of the first time, transitions an operation state of the head-mounted display device to the standby state, in which power consumption is low, after the elapse of the second time, and stops the supply of electric power to the head-mounted display device after the elapse of the third time. Therefore, it is possible to suppress the power consumption of the head-mounted display device.

APPLICATION EXAMPLE 6

This application example of the invention is directed to the head-mounted display device of any of Application Examples 1 to 5, which further includes a state display unit that displays an operation state of the head-mounted display device. When the head-mounted display device is in the suspension mode, the display control unit causes the state display unit to display that the head-mounted display device is in the suspension mode.

With such a configuration, when the head-mounted display device is in the suspension mode, the display control unit can cause the state display unit to display that the head-mounted display device is in the suspension mode.

APPLICATION EXAMPLE 7

This application example of the invention is directed to the head-mounted display device of any of Application Examples 1 to 6, which further includes an image processing unit that acquires a target image used for formation of a virtual image and generates the image data using the target image.

The invention can be implemented in various forms. For example, the invention can be implemented in forms of a head-mounted display device, a control method for the head-mounted display device, and a head-mounted display system, a computer program for realizing a function of the apparatus, the method, or the system, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
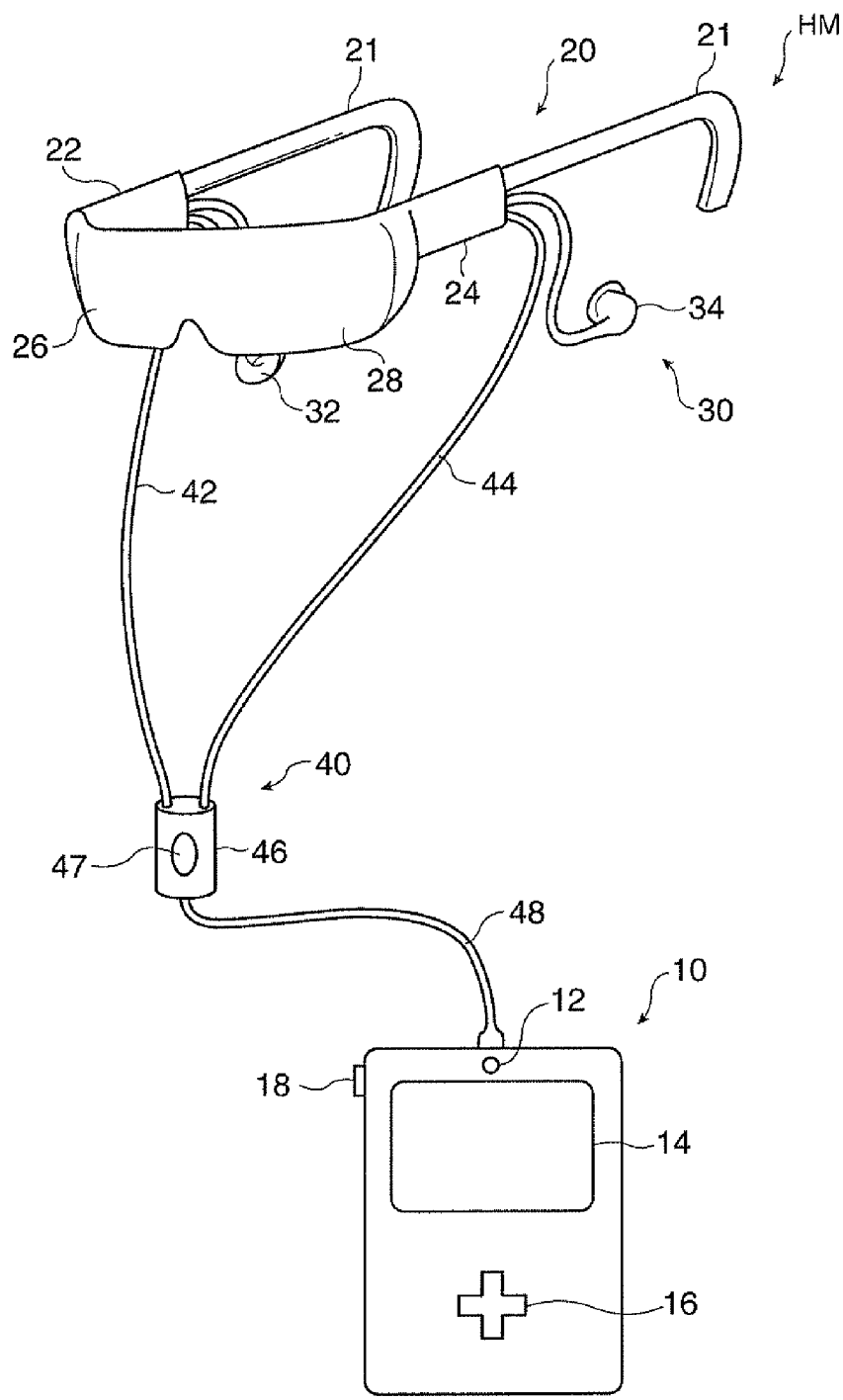
FIG. 1 is an explanatory diagram showing an external configuration of a head-mounted display device in a first embodiment of the invention.

Embodiments of the invention are explained below.
A. First Embodiment
(A-1) Configuration of a Head-Mounted Display Device FIG. 1 is an explanatory diagram showing an external configuration of a head-mounted display device in a first embodiment of the invention. A head-mounted display device (hereinafter referred to as "head-mounted display" as well) HM is mounted on the head of an observer and forms a virtual image before the left and right eyes of the observer. The head-mounted display HM includes a controller 10, an image display unit 20, an earphone 30, and a connecting unit 40.

The controller 10 and the image display unit 20 are connected by the connecting unit 40, whereby various signals are transmitted between the controller 10 and the image display unit 20. The connecting unit 40 includes a right cord 42, a left cord 44, a coupling member 46, a mute button 47, and a main body cord 48. The right cord 42 extending from the end of a right display unit 22, the left cord 44 extending from the end of a left display unit 24, and the main body cord 48 are connected to the coupling member 46. In the main body cord 48, a connector for connection to the controller 10 is formed at an end on the opposite side of a side connected to the coupling member 46. As the right cord 42, the left cord 44, and the main body cord 48, for example, a metal cable or an optical fiber can be adopted.

The mute button 47 is provided on the outside of a housing of the coupling member 46. The mute button 47 is an automatic reset switch (a momentary switch). The mute button 47 detects depression operation for the button and outputs a signal corresponding to detected content. A not-shown clip is provided on the outside of the housing of the coupling member 46 and on the rear surface of a surface on which the mute button 47 is provided. For example, in a state in which the observer wears the head-mounted display HM, the coupling member 46 can be retained by fastening the clip to clothes or the like of the observer.

The controller 10 is a device for operating the head-mounted display HM. The controller 10 includes a lighting unit 12, a touch panel 14, a cross key 16, and a power switch 18. The lighting unit 12 functioning as a state display unit notifies, with a light emitting state of the lighting unit 12, an operation state (e.g., on or off of a power supply) of the head-mounted display HM. As the lighting unit 12, for example, an LED (Light Emitting Diode) can be used. The touch panel 14 detects operation by a finger of the observer on an operation surface of the touch panel 14 and outputs a signal corresponding to detected content. The cross key 16 detects depression operation on keys corresponding to the up, down, left, and right directions and outputs a signal corresponding to detected content. The power switch 18 detects slide operation of the switch to switch a power input state of the head-mounted display HM.

The image display unit 20 is a mounted member mounted on the head of the observer. In this embodiment, the image display unit 20 has an eyeglass shape. The image display unit 20 includes ear hooking sections 21, the right display unit 22, the left display unit 24, a right optical panel 26, and a left optical panel 28. In the following explanation, the right display unit 22 and the left display unit 24 are generally referred to simply as "display unit" as well. The right optical panel 26 and the left optical panel 28 are generally referred to simply as "optical panel" as well. The ear hooking sections 21 are members provided to traverse on the ears of the observer from the ends of the right display unit 22 and the left display unit 24 and function as temples.

The display unit includes an LCD (Liquid Crystal Display) and a projection optical system not shown in the figure. Details are explained later. The optical panel includes a light guide plate and a light modulating plate not shown in the figure. The light guide plate is formed of a light transmissive resin material or the like and emits image light captured from the display unit to the eyes of the observer. The light modulating plate is an optical device of a thin plate shape and is arranged to cover the front side (the outside world side) of the light guide plate. The light modulating plate protects the light guide plate and suppresses, for example, damage to the light guide plate and adhesion of stains.

The earphone 30 is a mounted member further mounted on the ears of the observer in a state in which the image display unit 20 is mounted on the head of the observer. The earphone 30 includes a right earphone 32 for the right ear and a left earphone 34 for the left ear, which respectively convert an electric signal into sound waves.

Figure 2:
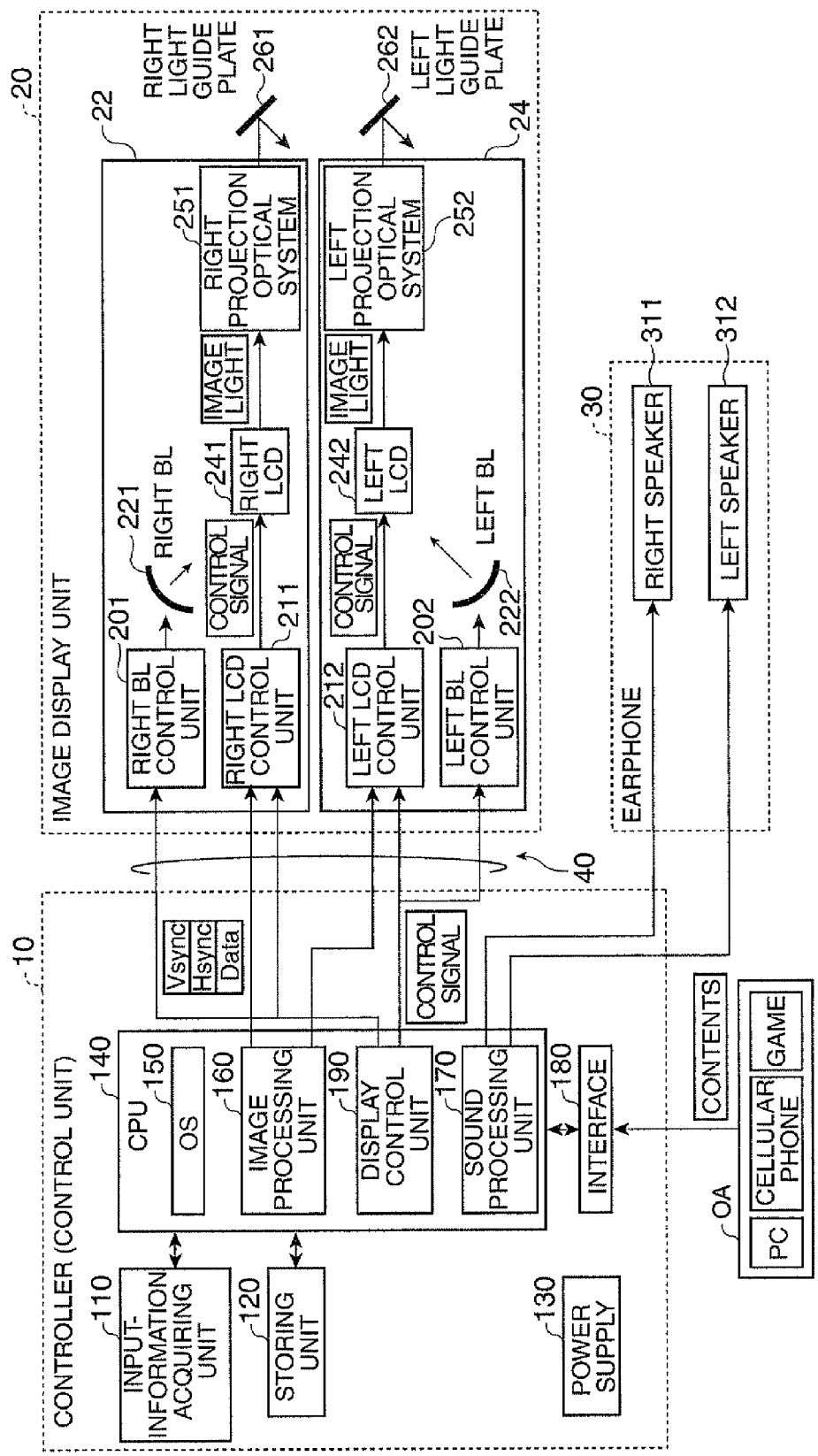
FIG. 2 is a block diagram functionally showing the configuration of the head-mounted display.

FIG. 2 is a block diagram functionally showing the configuration of the head-mounted display UM. The controller 10 includes an input-information acquiring unit 110, a storing unit 120, a power supply 130, a CPU 140, and an interface 180. The units are connected to one another by a not-shown bus.

The input-information acquiring unit 110 has a function of acquiring an operation input by the observer, for example, operation inputs to the mute button 47, the touch panel 14, the cross key 16, and the power switch 18. The storing unit 120 is a storing unit including a ROM, a RAM, a DRAM, a hard disk and the like not shown in the figure. The power supply 130 is a secondary battery that supplies electric power to the units of the head-mounted display HM.

The CPU 140 executes a computer program installed in advance to provide a function of an operating system (OS) 150. The CPU 140 expands firmware or a computer program stored in the ROM or the hard disk on the RAM and executes the firmware or the computer program to thereby function as an image processing unit 160 (details are explained later), a sound processing unit 170 (details are explained later), and a display control unit 190 (details are explained later) as well.

The interface 180 is an interface for connecting various external apparatuses OA, which are supply sources of contents, to the controller 10. As the interface 180, for example, a USE interface, a micro USE interface, a memory card interface, or the like can be provided. Contents mean information contents including an image (a still image or a moving image), sound and the like.

The image processing unit 160 has a function of generating image data for the right eye, which is image data to be supplied to the right display unit 22, and image data for the left eye, which is image data to be supplied to the left display unit 24. Specifically, the image processing unit 160 acquires an image signal included in the contents. For example, in the case of the moving image, in general, the acquired image signal is an analog signal including thirty frame images per second. The image processing unit 160 separates synchronization signals such as a vertical synchronization signal VSync and a horizontal synchronization signal HSync from the acquired image signal. The image processing unit 160 converts the analog image signal, from which the synchronization signal is separated, into a digital image signal using a not-shown A/D conversion circuit or the like. Thereafter, the image processing unit 160 stores the digital image signal after the conversion in the DRAM in the storing unit 120 frame by frame as image data (RGB data) of the target image. The image processing unit 160 outputs the image data of the target image as image data for the right eye and the image data for the left eye. The image processing unit 160 may execute, according to necessity, image processing such as resolution conversion processing, various kinds of color tone correction processing such as adjustment of luminance and chroma, and keystone correction processing on the image data of the target image stored in the storing unit 120.

The display control unit 190 has a function of outputting control signals indicating effectiveness or ineffectiveness of devices respectively to the right display unit 22 and the left display unit 24. The display control unit 190 outputs a signal indicating "effective" in a normal state (when the observer performs no operation). On the other hand, when the observer depresses the mute button 47 (FIG. 1), the display control unit 190 outputs, according to mute processing explained later, a signal indicating "ineffective" to specific devices included in the right display unit 22 and the left display unit 24. Details are explained later.

The sound processing unit 170 acquires sound signals included in the contents, amplifies the acquired sound signals, and outputs the sound signals respectively to a right speaker 311 and a left speaker 312 functioning as sound output units. When the observer depresses the mute button 47 (FIG. 1), the sound processing unit 170 stops, according to the mute processing explained later, the output of the sound signals to the right speaker 311 and the left speaker 312. Details are explained later.

The image display unit 20 includes the right display unit 22, the left display unit 24, a right light guide plate 261 functioning as the right optical panel 26, and a left light guide plate 262 functioning as the left optical panel 28. The right display unit 22 includes a right backlight (BL) control unit 201 functioning as a light source, a right LCD control unit 211, a right backlight (BL) 221 functioning as a light source, a right LCD 241, and a right projection optical system 251. The left display unit 24 includes a left backlight (BL) control unit 202 functioning as a light source, a left LCD control unit 212, a left backlight (BL) 222 functioning as a light source, a left LCD 242, and a left projection optical system 252. The right display unit 22 and the left display unit 24 form a pair. The units of the left display unit 24 have configurations and perform operations same as those of the units of the right display unit 22 explained below. Therefore, detailed explanation of the units of the left display unit 24 is omitted.

The right backlight control unit 201 has a function of driving the right backlight 221 on the basis of a control signal input via the connecting unit 40. The right backlight 221 is a light emitting member such as an LED. The right LCD control unit 211 has a function of driving the right LCD 241 on the basis of the vertical synchronization signal VSync, the horizontal synchronization signal HSync, and the image data for the right eye input via the connecting unit 40. The right LCD 241 functioning as a display device for the right eye is a transmissive liquid crystal panel in which plural pixels are arranged in a matrix shape. The right LCD 241 has a function of driving liquid crystals corresponding to the positions of the pixels arranged in the matrix shape to thereby change the transmittance of light transmitted through the right LCD 241 to modulate illumination light irradiated from the right backlight 221 into effective image light representing an image. In this embodiment, a backlight system is adopted. However, a configuration for emitting image light using a front light system or a reflection system may be adopted. The right projection optical system 251 includes a collimate lens that converts image light emitted from the right LCD 241 into a light beam in a parallel state.

Figure 3:
FIG. 3 is an explanatory diagram showing an image of recognition by an observer of a virtual image formed by the head-mounted display.

FIG. 3 is an explanatory diagram showing an image of recognition by the observer of a virtual image formed by the head-mounted display HM. As explained above, the image light emitted via the right LCD 241 is converted into a light beam by the right projection optical system 251 and repeatedly totally reflected by the right light guide plate 261. The light beam is emitted from a light emission surface of the right light guide plate 261 to the outside and made incident on the right eye of the observer as image light. The same applies concerning the left LCD 242, the left projection optical system 252, and the left light guide plate 262. The image lights respectively made incident on the left and right eyes of the observer are focused on the retinas of the observer. Consequently, the observer can recognize as if one virtual image VI is formed in a visual field area. The projection optical system and the light guide plate are generally referred to as "light guide unit" as well. The light guide unit guides the image light generated by the display device (LCD) to the eyes of the observer, in other words, forms a virtual image from the image light generated by the display device.

(A-2) Mute Processing

Figure 4:
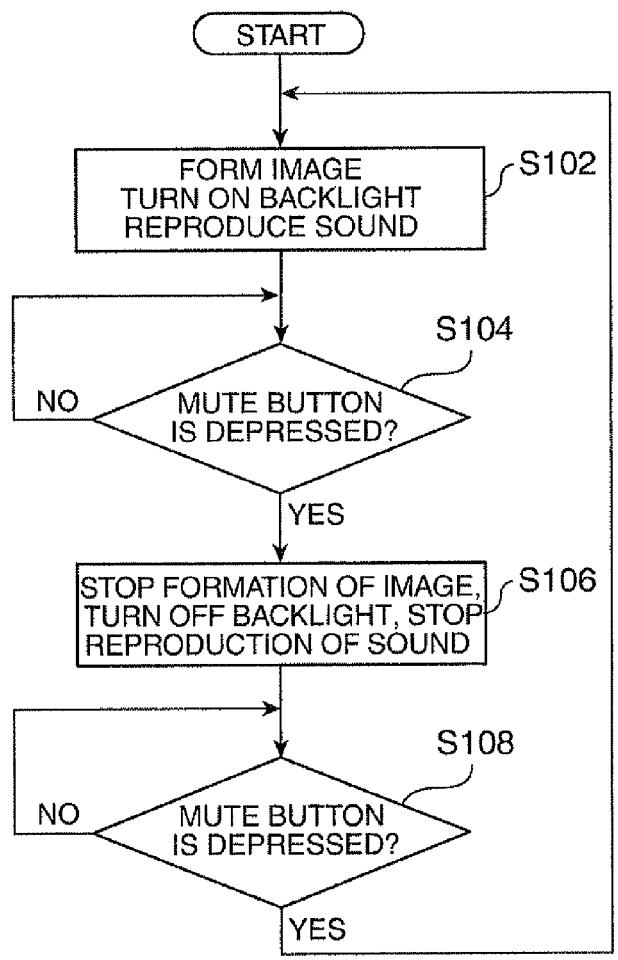
FIG. 4 is a flowchart for explaining a procedure of mute processing.

FIG. 4 is a flowchart for explaining a procedure of the mute processing. In the normal state, a virtual image is formed before the left and right eyes of the observer who wears the head-mounted display HM and sound is reproduced (step S102). Specifically, in step S102, the display control unit 190 transmits control signals indicating "effective" respectively to the right LCD control unit 211, the left LCD control unit 212, the right backlight control unit 201, and the left backlight control unit 202. The right LCD control unit 211 that receives the control signal indicating "effective" drives the right LCD 241 and generates an image on the basis of the input image data for the right eye. The right backlight control unit 201 that receives the control signal indicating "effective" irradiates illumination light by the right backlight 221 on the image generated by the right LCD 241 to emit image light representing the image. The same applies concerning the left LCD control unit 212 and the left backlight control unit 202. As a result, a virtual image is formed before the eyes of the observer.

In step S102, the sound processing unit 170 amplifies sound signals included in contents and outputs the sound signals respectively to the right speaker 311 and the left speaker 312. As a result, sound is reproduced from the earphone 30. The state of the head-mounted display HM in step S102 is referred to as "normal state" of the head-mounted display HM as well. When the head-mounted display HM is in the normal state, the display control unit 190 turns on the lighting unit 12.

The display control unit 190 determines whether the mute button 47 is depressed (step S104). When the mute button 47 is not depressed (NO in step S104), the display control unit 190 continues the formation of a virtual image and the reproduction of sound.

On the other hand, when the mute button 47 is depressed (YES in step S104), the display control unit 190 stops the formation of a virtual image and the reproduction of sound (step S106). Specifically, in step S106, the display control unit 190 changes the control signals transmitted to the right backlight control unit 201 and the left backlight control unit 202 to control signals indicating "ineffective". The display control unit 190 keeps the control signals transmitted to the right LCD control unit 211 and the left LCD control unit 212 indicating "effective". The right LCD control unit 211 that receives the control signal indicating "effective" drives the right LCD 241 and generates an image on the basis of input image data for the right eye. On the other hand, the right backlight control unit 201 that receives the control signal indicating "ineffective" turns off illumination light by the right backlight 221. Therefore, the image generated by the right LCD 241 is not emitted as image light. The same applies concerning the left LCD control unit 212 and the left backlight control unit 202. As a result, the formation of a virtual image is stopped.

In step S106, the display control unit 190 requests the sound processing unit 170 to stop the output of the sound signals. The sound processing unit 170 stops the output of the sound signals to both the right speaker 311 and the left speaker 312, whereby the sound reproduced from the earphone 30 is stopped. The state of the head-mounted display HM in step S106 is referred to as "suspension mode" of the head-mounted display HM as well. When the head-mounted display HM is in the suspension mode, the display control unit 190 turns on and off the lighting unit 12.

When the head-mounted display HM is in the suspension mode, the display control unit 190 determines whether the mute button 47 is depressed (step S108). When the mute button 47 is not depressed (NO in step S108), the display control unit 190 continues the suspension mode of the head-mounted display HM.

On the other hand, when the mute button 47 is depressed (YES in step S108), the display control unit 190 transitions the processing to step S102 and ends the suspension mode of the head-mounted display HM. Consequently, the head-mounted display HM changes to the normal state, a virtual image is formed before the eyes of the observer, and sound is reproduced from the earphone 30.

Even when the head-mounted display HM is in the suspension mode as explained above, the right LCD 241 and the left LCD 242 are driven. Therefore, for example, even when the observer depresses the mute button 47 during reproduction of a video in the head-mounted display HM, although the formation of a virtual image before the eyes is stopped, the reproduction of the video by the LCDs is continued. Therefore, when the observer depresses the mute button 47 again to end the suspension mode, a phenomenon occurs in which the video being reproduced proceeds from the point of the first depression of the mute button 47. In order to suppress such a phenomenon, the display control unit 190 may request, when transitioning from step S108 to step S102, the image processing unit 160 and the sound processing unit 170 to change the image data and the sound signals to be output. Specifically, the display control unit 190 can store, in advance, information for specifying the video reproduced by the LCDs at the point of the transition to the step S106 (e.g., reproduction time in contents) and request, when transitioning from step S108 to step S102, the image processing unit 160 and the sound processing unit 170 to output an image and sound in a rewound state using the information.

In the first embodiment, the head-mounted display HM is the HMD device of the binocular type. However, the head-mounted display HM may be configured as an HMD device of a monocular type (i.e., a head-mounted display including only the right display unit 22 and the right optical panel 26 or the left display unit 24 and the left optical panel 28). Even in that case, the mute processing can be executed according to a procedure same as the procedure explained with reference to FIG. 4.

As explained above, according to the first embodiment, when the display control unit 190 receives depression operation (mute operation) for the mute button 47 by the observer, the display control unit 190 transitions to the suspension mode for turning off the right backlight 221 and the left backlight 222 and stopping the output of sound signals by the sound processing unit 170 and stops the formation of a virtual image and the reproduction of sound by the head-mounted display HM. In the transmissive head-mounted display in this embodiment, if the formation of a virtual image and the reproduction of sound are stopped, even in a state in which the observer keeps wearing the head-mounted display HM, the observer can check the state of the outside world. The turn-off of the backlights can be simply and instantaneously performed compared with the stop of the driving of the LCDs. Therefore, when mute operation (a suspension request) is performed, it is possible to enable the observer to quickly check the state of the outside world. Further, when the suspension mode is ended and the head-mounted display HM is reset to the normal state, since the backlights only have to be turned on again, it is possible to quickly reset the head-mounted display HM to the normal state.

When the mute operation is received, the display control unit 190 turns off both the pair of backlights (the right backlight 221 and the left backlight 222). The sound processing unit 170 stops the output of sound signals to both the pair of sound output units (the right speaker 311 and the left speaker 312). Therefore, even when the mute operation (the suspension request) is performed in the head-mounted display HM of the binocular type, it is possible to enable the observer to quickly check the state of the outside world.

When the head-mounted display HM is in the normal state (step S102), the display control unit 190 turns on the lighting unit 12. When the head-mounted display HM is in the suspension mode (step S106), the display control unit 190 turns on and off the lighting unit 12. In other words, when the head-mounted display HM is in the suspension mode, the display control unit 190 can cause the state display unit (the lighting unit 12) to display that the head-mounted display HM is in the suspension mode. As a result, it is possible to improve convenience of use of the head-mounted display HM.

The mute button 47 is arranged on the outside of the housing of the coupling member 46, i.e., a branch portion of the right cord 42 and the left cord 44. Therefore, the observer can easily reach the mute button 47. For example, even when the controller 10 is stored in a pocket or the like, the observer can easily operate the controller 10. Further, the clip is provided on the outside of the housing of the coupling member 46 and on the rear surface of the surface on which the mute button 47 is provided. Therefore, the observer can retain the coupling member 46 (the mute button 47) in a favorite place of clothes or the like.

B. Second Embodiment

In a second embodiment of the invention, a configuration including a first suspension mode and a second suspension mode is explained. In the following explanation, only components that have configurations and perform operations different from those in the first embodiment are explained. Components same as those in the first embodiment in the figures are denoted by reference numerals and signs same as those in the first embodiment explained above. Detailed explanation of the components is omitted.

(B-1) Configuration of a Head-Mounted Display Device

The configuration of a head-mounted display HM in the second embodiment is the same as the configuration in the first embodiment explained with reference to FIGS. 1 to 3.

(B-2) Mute Processing

Figure 5:
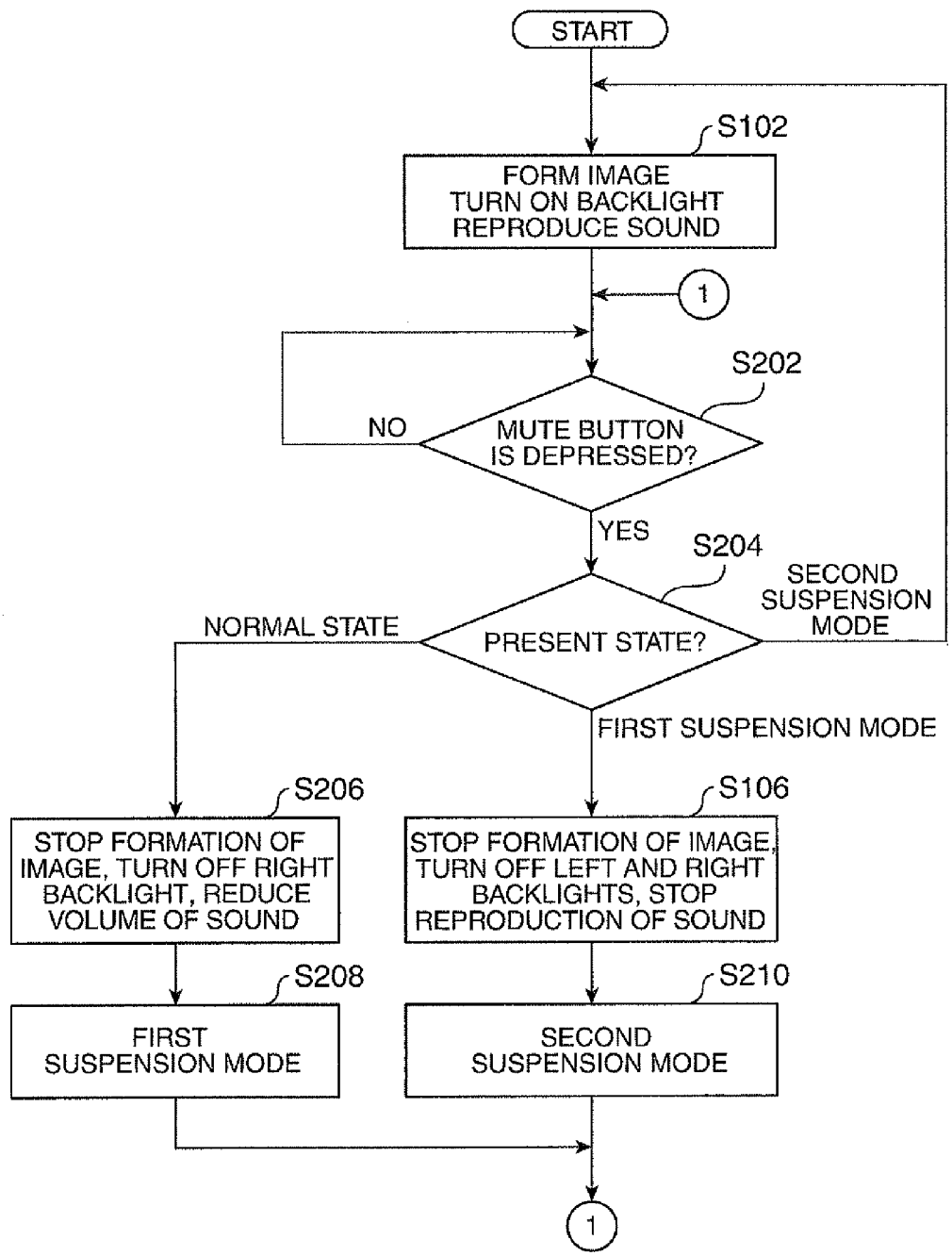
FIG. 5 is a flowchart for explaining a procedure of mute processing in a second embodiment.

FIG. 5 is a flowchart for explaining a procedure of mute processing in the second embodiment. In the normal state, a virtual image is formed before the eyes of an observer who wears the head-mounted display HM and sound is reproduced (step S102). Details are the same as the details of step S102 in FIG. 4. In step S202 in FIG. 5, the display control unit 190 determines whether the mute button 47 is depressed. When the mute button 47 is not depressed (NO in step S202), the display control unit 190 continues the formation of a virtual image and the reproduction of sound.

On the other hand, when the mute button 47 is depressed (YES in step S202), the display control unit 190 determines the present state of the head-mounted display HM (step S204). The state of the head-mounted display HM can be determined by various methods. For example, an area for storing the present state (the normal state, the first suspension mode, or the second suspension mode) of the head-mounted display EM is provided in the storing unit 120. The display control unit 190 can determine the state of the head-mounted display HM by referring to the area.

When the display control unit 190 determines that the present state of the head-mounted display HM is the normal state (normal state in step S204), the display control unit 190 stops the formation of a virtual image by the right display unit 22 and reduces the volume of the sound being reproduced (step S206). Specifically, in step S206, the display control unit 190 changes a control signal transmitted to the right backlight control unit 201 to a control signal indicating "ineffective". A control signal transmitted to the left backlight control unit 202 and control signals transmitted to the right LCD control unit 211 and the left LCD control unit 212 are kept indicating "effective". The right LCD control unit 211 and the left LCD control unit 212 that receive the control signals indicating "effective" respectively drive the right LCD 241 and the left LCD 242 and generate images. The right backlight control unit 201 that receives the control signal indicating "ineffective" turns off illumination light by the right backlight 221. Therefore, an image generated by the right LCD 241 is not emitted as image light. On the other hand, the left backlight control unit 202 that receives the control signal indicating "effective" keeps illumination light by the left backlight 222 on. Therefore, an image generated by the left LCD 242 is emitted as image light. As a result, the formation of a virtual image by the right display unit 22 is stopped and only a virtual image by the left display unit 24 is formed before the eyes of the observer.

In step S206, the display control unit 190 requests the sound processing unit 170 to reduce volume. The sound processing unit 170 amplifies (adjusts) sound signals included in contents to reduce the volume of sound output from the right speaker 311 and the left speaker 312 to be equal to or smaller than a predetermined dB value and then outputs the sound signals respectively to the right speaker 311 and the left speaker 312. The predetermined dB value can be arbitrarily set. However, it is desirable that the predetermined dB value is set small enough for enabling the observer to identify sound in an external environment.

The state of the head-mounted display HM in step S206, i.e., a state in which a virtual image is formed before the left eye of the observer is referred to as "first suspension mode" of the head-mounted display HM as well. After updating content of the area in the storing unit 120 for storing the present state of the head-mounted display HM to content indicating the "first suspension mode", the display control unit 190 transitions the processing to step S202 (step S208).

When the display control unit 190 determines that the present state of the head-mounted display HM is the first suspension mode (first suspension mode in step S204), the display control unit 190 stops the formation of a virtual image and the reproduction of sound (step S106). Details are the same as the details of step S106 in FIG. 4.

In the second embodiment, the state of the head-mounted display HM in step S106, i.e., a state in which the formation of a virtual image is stopped on both the left and right is referred to as "second suspension mode" of the head-mounted display HM as well. After updating content of the area in the storing unit 120 for storing the present state of the head-mounted display HM to content indicating the "second suspension mode", the display control unit 190 transitions the processing to step S202 (step S210).

When the display control unit 190 determines that the present state of the head-mounted display HM is the second suspension mode (second suspension mode in step S204), the display control unit 190 transitions the processing to step S102 and ends the second suspension mode of the head-mounted display HM. Consequently, the head-mounted display HM changes to the normal state, a virtual image is formed before the eyes of the observer, and sound is reproduced from the earphone 30.

As explained above, according to the second embodiment, when the display control unit 190 receives depression operation (mute operation) of the mute button 47 by the observer, the display control unit 190 changes the head-mounted display HM to the first suspension mode. In the first suspension mode, one (the right backlight 221) of the pair of backlights is turned off and the sound signal by the sound processing unit 170 is output after being adjusted to reduce the volume of sound output from the right speaker 311 and the left speaker 312 to be equal to or smaller than the predetermined dB value. Therefore, when the mute operation (the suspension request) is performed in the head-mounted display HM of the binocular type, the observer can quickly check the state of the outside world while enjoying an image (a video) and sound.

Further, when the display control unit 190 receives the mute operation (the suspension request) in a state in which the head-mounted display HM is in the first suspension mode, the display control unit 190 changes the head-mounted display HM to the second suspension mode. In the second suspension mode, both the pair of backlights (the right backlight 221 and the left backlight 222) are turned off and the sound signal by the sound processing unit 170 is stopped. In other words, the observer can transition, by continuously performing the mute operation, the state of the head-mounted display HM to the second suspension mode in which the state of the outside world can be checked more in detail. As a result, it is possible to improve convenience.

C. Third Embodiment

In a third embodiment of the invention, a configuration for changing the state of the head-mounted display HM and realizing power saving when the suspension mode of the head-mounted display HM continues for a fixed time is explained. In the following explanation, only components that have configurations and perform operations different from those in the first embodiment are explained. Components same as those in the first embodiment in the figures are denoted by reference numerals and signs same as those in the first embodiment explained above. Detailed explanation of the components is omitted.

(C-1) Configuration of the Head-Mounted Display Device

The configuration of the head-mounted display HM in the third embodiment is the same as the configuration in the first embodiment explained with reference to FIGS. 1 to 3.

(C-2) Mute Processing

Mute processing in the third embodiment is the same as the mute processing in the first embodiment explained with reference to FIG. 4.

(C-3) Power Saving Processing

Figure 6:
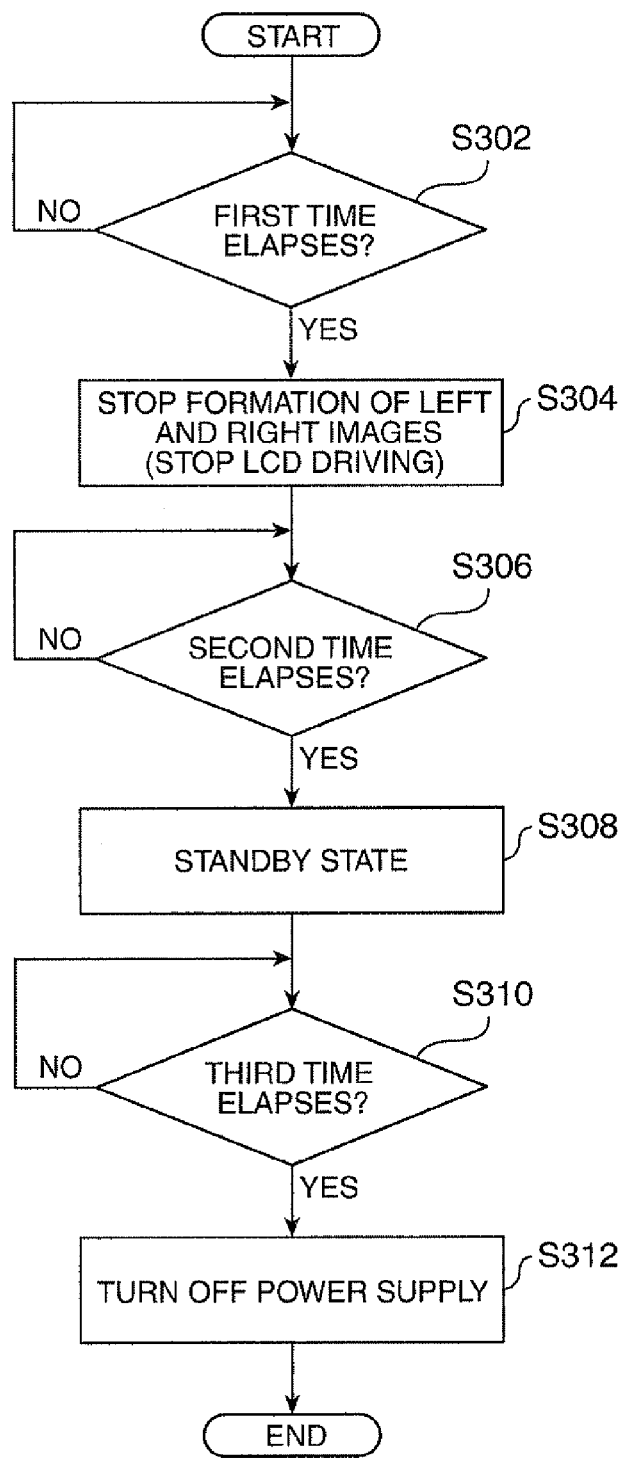
FIG. 6 is a flowchart for explaining a procedure of power saving processing in a third embodiment.

FIG. 6 is a flowchart for explaining a procedure of power saving processing in the third embodiment. The power saving processing is processing for changing the state of the head-mounted display HM and realizing power saving when the suspension mode of the head-mounted display HM continues for the fixed time. The power saving processing is executed by the display control unit 190.

The display control unit 190 determines whether a first time set in advance elapses while the head-mounted display HM is kept in the suspension mode (in other words, the state of steps S106 and S108 in FIG. 4) (step S302). When the first time does not elapse (NO in step S302), the display control unit 190 transitions the processing to step S302 and waits for the first time to elapse. On the other hand, when the first time elapses (YES in step S302), the display control unit 190 stops the driving of the LCDs (step S304). Specifically, the display control unit 190 changes control signals transmitted to the right LCD control unit 211 and the left LCD control unit 212 to control signals indicating "ineffective". The right LCD control unit 211 and the left LCD control unit 212 that receive the control signals indicating "ineffective" stop the driving of the right LCD 241 and the left LCD 242. Consequently, the formation of images by the LCDs is stopped.

Subsequently, the display control unit 190 determines whether a second time set in advance elapses while the head-mounted display HM is kept in the suspension mode (step S306). When the second time does not elapse (NO in step S306), the display control unit 190 transitions the processing to step S306 and waits for the second time to elapse. On the other hand, when the second time elapses (YES in step S306), the display control unit 190 transitions the operation state of the head-mounted display HM to a standby state (step S308). The standby state only has to be a state in which power consumption is low compared with an active state in which the formation of a virtual image is possible (in other words, the normal state). The standby state can be arbitrarily set. For example, in step S308, the display control unit 190 may change the operation state of the head-mounted display HM to a so-called sleep state in which the operation of the CPU 140 is temporarily stopped.

The display control unit 190 determines whether a third time set in advance elapses while the head-mounted display HM is kept in the suspension mode (step S310). When the third time does not elapse (NO in step S310), the display control unit 190 transitions the processing to step S310 and waits for the third time to elapse. On the other hand, when the third time elapses (YES in step S310), the display control unit 190 stops the supply of electric power to the head-mounted display HM (turns off a power supply) (step S312). The first to third times can be arbitrarily set.

As explained above, according to the third embodiment, when the head-mounted display HM is in the suspension mode, after the elapse of the first time, the display control unit 190 stops the formation of images by the display devices (the right LCD 241 and the left LCD 242). After the elapse of the second time, the display control unit 190 transitions the operation state of the head-mounted display HM to the standby state in which power consumption is low. After the elapse of the third time, the display control unit 190 stops the supply of electric power to the head-mounted display HM. Therefore, when the suspension mode of the head-mounted display HM continues for the fixed time, it is possible to change the state of the head-mounted display HM and realize power saving. It is possible to suppress the power consumption of the head-mounted display HM.

D. Modifications

The invention is not limited to the embodiments explained above. Various configurations can be adopted without departing from the spirit of the invention. For example, functions realized by software may be realized by hardware. Besides, modifications explained below are possible.

D1. Modification 1

In the embodiments, the configuration of the head-mounted display is exemplified. However, the configuration of the head-mounted display can be arbitrarily set without departing from the spirit of the invention. For example, addition, deletion, and conversion of the components can be performed.

For example, the configurations of the controller, the image display unit, the earphone, and the connecting unit shown in FIG. 1 can be arbitrarily changed. Specifically, the controller is not limited to the form explained with reference to FIG. 1 and may include, for example, a mute button. The touch panel may be omitted from the controller and the observer may operate the controller only with the cross key. Another operation interface such as an operation stick may be provided in the controller. Devices such as a keyboard and a mouse may be connectable to the controller and the controller may receive inputs from the keyboard and the mouse. A communication unit employing Wi-Fi (wireless fidelity) or the like may be provided in the controller.

For example, the controller shown in FIG. 1 is connected to the image display unit via the wired signal transmission line. However, the controller and the image display unit may be connected via a wireless signal transmission line such as a wireless LAN, infrared communication, or Bluetooth (registered trademark).

For example, the head-mounted display is the transmissive HMD of the binocular type. However, the head-mounted display may be configured as a non-transmissive HMD that blocks an external scenery in a state in which the observer wears the HMD device. The head-mounted display may be an HMD of a monocular type.

For example, the display unit is configured using the LCDs, the LCD control units, and the backlights. However, instead of the LCDs, the LCD control units, and the backlights, organic EL (Organic Electro-Luminescence) and an organic EL control unit may be used. In this case, the organic EL is equivalent to the "display device" and the "light source" in the appended claims.

For example, the functional units such as the image processing unit, the display control unit, and the sound processing unit are explained as being realized by the CPU expanding the computer program stored in the ROM or the hard disk on the RAM and executing the computer program. However, these functional units may be configured using an ASIC (Application Specific Integrated Circuit) designed to realize the functions of the functional units.

For example, in the embodiments, the image display unit is the HMD worn as eyeglasses. However, the image display unit may be a normal flat display device (a liquid crystal display device, a plasma display device, an organic electroluminescence (EL) display device, etc.). In this case, the connection between the controller and the image display unit may be the connection via the wired signal transmission line or may be the connection via the wireless signal transmission line. This makes it possible to use the controller as a remote controller of the normal flat display device.

As the image display unit, an image display unit of another shape such as an image display unit worn like a cap may be adopted instead of the image display unit worn like eyeglasses. As the earphone, an ear hooking type or headband type earphone may be adopted. The earphone may be omitted.

D2. Modification 2

In the embodiment, the image processing unit outputs the same image data as the image data for the right eye and the image data for the left eye. However, the image processing unit may be configured to be capable of outputting the image data for the right eye and the image data for the left eye as different image data and forming a 3D virtual image.

D3. Modification 3

In the first embodiment, the example of the mute processing is explained. However, for example, the procedure of the processing explained in the first embodiment is only an example and can be variously modified.

For example, in the first embodiment, the mute button is explained on the premise that the mute button is the momentary switch. However, the mute button may be a switch of another form. Specifically, in the mute processing (FIG. 4) in the first embodiment, the head-mounted display is transitioned to the suspension mode according to first (odd number-th) detection of switch depression operation and the suspension mode of the head-mounted display is ended according to second (even number-th) detection of switch depression operation. However, the mute button may be a position retaining switch (an alternate switch), on and off of which are reversed every time the switch is depressed. In step S104 in FIG. 4, the display control unit may determine whether the mute button is in an ON state. In step S108, the display control unit may determine whether the mute button is in an OFF state.

D4. Modification 4

In the second embodiment, the example of the mute processing is explained. However, for example, the procedure of the processing explained in the second embodiment is only an example and can be variously modified.

For example, in step S204 of the mute processing (FIG. 5) in the second embodiment, the display control unit determines the state of the head-mounted display by referring to the area provided in the storing unit. However, the display control unit can also determine the state of the head-mounted display according to another method. For example, the display control unit may determine the state of the head-mounted display from lighting states of the left and right backlights. In that case, when the right backlight is on, the display control unit determines that the head-mounted display is in the normal state. When the right backlight is off and the left backlight is on, the display control unit determines that the head-mounted display is in the first suspension mode. When the left and right backlights are off, the display control unit determines that the head-mounted display is in the second suspension mode.

For example, in the second embodiment, the mute button is explained on the premise that the mute button is the momentary switch. However, the mute button may be a switch of another form. Specifically, for example, the mute button may be a slide switch. Steps S202 and S204 in FIG. 5 may be replaced with processing for determining the position of the slide switch.

D5. Modification 5

In the third embodiment, the example of the power saving processing is explained. However, for example, the procedure of the processing explained in the third embodiment is only an example and can be variously modified.

For example, the display control unit performs the power saving processing when the head-mounted display is in the suspension mode explained in FIG. 4. However, the display control unit may perform the power saving processing when the head-mounted display is in the first suspension mode (the state in which a virtual image is formed before the left eye of the observer) explained in the second embodiment (FIG. 5). The display control unit may perform the power saving processing when the head-mounted display is in the second suspension mode (the state in which the formation of a virtual image is stopped on both the left and right) explained in the second embodiment (FIG. 5).

For example, the display control unit stops the driving of the display device after the elapse of the first time, changes the head-mounted display to the standby state after the elapse of the second time, and turns off the power supply for the head-mounted display after the elapse of the third time. However, a part of these kinds of processing may be omitted or the order of these kinds of processing may be changed.

The entire disclosure of Japanese Patent Application No. 2011-022206, filed Feb. 4, 2011 is expressly incorporated by reference herein.

What is claimed is:

1. A head-mounted display device configured for mounting on a head of an observer and forming a virtual image before eyes of the observer, the head-mounted display device comprising:
 a display device that forms an image, which is a source of image light, from image data;
 a light source that emits the image light representing the formed image;
 a light guide unit that forms a virtual image from the emitted image light; and
 a display control unit that turns off the light source to prevent formation of the virtual image and changes the head-mounted display device to a suspension mode when a suspension request is received from an outside, the display control unit continuing forming the image during the suspension mode with the light source turned off.

2. The head-mounted display device according to claim 1, further comprising:
 a sound output unit that outputs sound; and
 a sound processing unit that acquires a sound signal, outputs the sound signal to the sound output unit, and, when the suspension request is received, stops the output of the sound signal and changes the head-mounted display device to the suspension mode.

3. The head-mounted display device according to claim 2, wherein
 the head-mounted display device includes a pair of the display devices, a pair of the light sources, and a pair of the light guide units corresponding to left and right eyes of the observer and a pair of the sound output units corresponding to left and right ears of the observer,
 the display control unit turns off both the pair of the light sources when the suspension request is received, and
 the sound processing unit stops the output of the sound signal to both the pair of the sound output units when the suspension request is received.

4. The head-mounted display device according to claim 2, wherein
 the head-mounted display device includes a pair of the display devices, a pair of the light sources, and a pair of the light guide units corresponding to left and right eyes of the observer and a pair of the sound output units corresponding to left and right ears of the observer,
 the display control unit turns off one of the pair of the light sources when the suspension request is received, and
 the sound processing unit outputs the sound signal adjusted to reduce volume of the sound output from the sound output unit to be equal to or smaller than a predetermined dB value to both the pair of the sound output units when the suspension request is received.

5. The head-mounted display device according to claim 1, wherein, when the head-mounted display device is in the suspension mode, the display control unit stops the formation of an image by the display device after elapse of a first time set in advance, transitions an operation state of the head-mounted display device to a standby state, in which power consumption is low compared with an active state in which formation of a virtual image is possible, after elapse of a second time set in advance, and stops supply of electric power to the head-mounted display device after elapse of a third time set in advance.

6. The head-mounted display device according to claim 1, further comprising a state display unit that displays an operation state of the head-mounted display device, wherein
 when the head-mounted display device is in the suspension mode, the display control unit causes the state display unit to display that the head-mounted display device is in the suspension mode.

7. The head-mounted display device according to claim 1, further comprising an image processing unit that acquires a target image used for formation of a virtual image and generates the image data using the target image.

8. A control method for a head-mounted display device configured for mounting on a head of an observer and forming a virtual image before eyes of the observer, the control method comprising:
 (a) forming an image, which is a source of image light, from image data;
 (b) emitting the image light representing the formed image;
 (c) forming a virtual image from the emitted image light; and
 (d) stopping the emission of the image light in the step (b) to prevent formation of the virtual image and changing the head-mounted display device to a suspension mode when a suspension request is received from an outside, while continuing forming the image during the suspension mode.

9. The head-mounted display device according to claim 1, wherein, when the suspension mode ends, the display control unit turns on the light source and the light guide unit begins forming the virtual image in a rewound state based on image formed during the suspension mode.

10. The control method according to claim 8, further comprising:
 when the suspension mode ends, reassuming the emission of the image light in the step (b) and beginning to form the virtual image in a rewound state based on image formed during the suspension mode.

11. A head-mounted display device configured for mounting on a head of an observer and forming a virtual image before eyes of the observer, the head-mounted display device comprising:
- a display device that forms an image, which is a source of image light, from image data;
- a light source that emits the image light representing the formed image;
- a light guide unit that forms a virtual image from the emitted image light; and
- a display control unit that turns off the light source and changes the head-mounted display device to a suspension mode when a suspension request is received from an outside,
- wherein, when the head-mounted display device is in the suspension mode, the display control unit stops the formation of an image by the display device after elapse of a first time set in advance, transitions an operation state of the head-mounted display device to a standby state, in which power consumption is low compared with an active state in which formation of a virtual image is possible, after elapse of a second time set in advance, and stops supply of electric power to the head-mounted display device after elapse of a third time set in advance.

12. The head-mounted display device according to claim 11, wherein
- the display device continues forming the image during the suspension mode, and
- when the suspension mode ends, the display control unit turns on the light source and the light guide unit begins forming the virtual image in a rewound state based on image formed during the suspension mode.

13. A head-mounted display device configured for mounting on a head of an observer and forming a virtual image before eyes of the observer, the head-mounted display device comprising:
- a display device that forms an image, which is a source of image light, from image data;
- a light source that emits the image light representing the formed image;
- a light guide unit that forms a virtual image from the emitted image light; and
- a display control unit that turns off the light source to prevent formation of the virtual image and changes the head-mounted display device to a suspension mode in response to receiving a suspension request, and the display control unit continuing to drive the light guide unit during the suspension mode.

* * * * *